United States Patent
Fujii et al.

(10) Patent No.: US 12,404,202 B2
(45) Date of Patent: Sep. 2, 2025

(54) METHOD FOR MANUFACTURING GLASS SHEET

(71) Applicant: Nippon Electric Glass Co., Ltd., Shiga (JP)

(72) Inventors: Takahide Fujii, Shiga (JP); Hisatoshi Aiba, Shiga (JP); Tsuyoshi Okuno, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 339 days.

(21) Appl. No.: 17/789,569

(22) PCT Filed: Jan. 12, 2021

(86) PCT No.: PCT/JP2021/000670
§ 371 (c)(1),
(2) Date: Jun. 28, 2022

(87) PCT Pub. No.: WO2021/157289
PCT Pub. Date: Aug. 12, 2021

(65) Prior Publication Data
US 2023/0052059 A1    Feb. 16, 2023

(30) Foreign Application Priority Data
Feb. 3, 2020    (JP) ................. 2020-016287

(51) Int. Cl.
*C03B 33/09*    (2006.01)
*C03B 33/02*    (2006.01)

(52) U.S. Cl.
CPC ........ *C03B 33/091* (2013.01); *C03B 33/0222* (2013.01)

(58) Field of Classification Search
CPC ........ C03B 33/091; C03B 33/033; B26F 3/16
See application file for complete search history.

(56) References Cited

U.S. PATENT DOCUMENTS

2002/0179667 A1*  12/2002  Hauer ............ B23K 26/082
                                                    225/2
2009/0032505 A1*  2/2009   Huang ............ C03B 33/04
                                                    219/121.67
(Continued)

FOREIGN PATENT DOCUMENTS

CN    107438584        12/2017
JP    2000247671 A  *  9/2000  ........... B23K 26/364
(Continued)

OTHER PUBLICATIONS

Schott, TIE-32: Thermal loads on optical glass, Aug. 2004, https://www.schott.com/shop/medias/schott-tie-32-thermal-loads-on-optical-glass-eng.pdf?context=bWFzdGVyfHJvb3R8MjUxODMwfGFwcGxpY2F0aW9uL3BkZnxoZDEvaDQ1Lzg4MTc0MDk3ODU4ODYucGRmfDRhOTIhMzJIOTdmNDVKZWI3NTIxYjI2N2ZIMjM3MmRiNjcwNjQ4YWFiNTgyNzczNjFjNjihNTUyNjQ3ZjNINTE (Year: 2004).*

(Continued)

*Primary Examiner* — Alison L Hindenlang
*Assistant Examiner* — Steven S Lee
(74) *Attorney, Agent, or Firm* — Wenderoth, Lind & Ponack, L.L.P.

(57) ABSTRACT

This method includes: an initial crack forming step of forming an initial crack (CR1) on a first surface (MG1) of a mother glass sheet (MG); and a laser irradiation step of irradiating the mother glass sheet (MG) with laser light (L) to cause a crack (CR2) to propagate along a preset cleaving line (CL) through use of the initial crack (CR1) as a starting point. The laser irradiation step includes irradiating a second surface (MG2) of the mother glass sheet (MG) with the laser light (L) to heat a surface layer (SL) and an inner portion (IL) of the second surface (MG2), to thereby cause, through a thermal shock caused by the heating, the crack (CR2) to propagate in an entire thickness direction of the mother glass (Continued)

sheet (MG) while propagating along the preset cleaving line (CL).

10 Claims, 6 Drawing Sheets

(56) References Cited

U.S. PATENT DOCUMENTS

| | | | |
|---|---|---|---|
| 2016/0280580 A1* | 9/2016 | Bohme | C03B 33/091 |
| 2017/0369357 A1* | 12/2017 | Vogt | C03B 33/0235 |

FOREIGN PATENT DOCUMENTS

| | | | | |
|---|---|---|---|---|
| JP | 2010-229005 | | 10/2010 | |
| JP | 2010229005 A | * | 10/2010 | C03B 33/03 |
| JP | 2011-116611 | | 6/2011 | |
| JP | 2011-201200 | | 10/2011 | |
| JP | 2013-136073 | | 7/2013 | |
| JP | 2013136073 A | * | 7/2013 | B23K 26/351 |
| JP | 2016-69223 | | 5/2016 | |
| JP | 2016069223 A | * | 5/2016 | C03B 33/0222 |
| KR | 102022102 B1 | * | 9/2019 | C03B 33/102 |
| WO | WO-2011117006 A1 | * | 9/2011 | B23K 26/0006 |

OTHER PUBLICATIONS

Ha, Young Wook. Written Opinion for Application No. 10-2022-7019661, Nov. 18, 2024 (Year: 2024).*

International Search Report issued Mar. 23, 2021 in corresponding International Application No. PCT/JP2021/000670.

International Preliminary Report on Patentability and Written Opinion of the International Searching Authority issued Jul. 28, 2022 in corresponding International (PCT) Patent Application No. PCT/JP2021/000670.

Office Action issued Jun. 30, 2023 in corresponding Chinese Patent Application No. 2021800071575.5, with English language translation of Search Report.

* cited by examiner

METHOD FOR MANUFACTURING GLASS SHEET

TECHNICAL FIELD

The present invention relates to a method of manufacturing a glass sheet having a predetermined shape by cleaving a mother glass sheet through irradiation with laser light.

BACKGROUND ART

As is well known, various glass sheets to be used for displays, such as a liquid crystal display and an OLED display, OLED lighting, a solar cell panel, and the like are each formed into a predetermined shape through the step of cutting a mother glass sheet.

For example, in Patent Literature 1, there is disclosed laser cleaving as a technology of cutting a mother glass sheet. In this laser cleaving, first, an initial crack is formed on a mother glass sheet (glass film having a thickness of 0.2 mm or less) with a crack former, such as a diamond cutter. Next, the mother glass sheet is heated through irradiation with laser light along a preset cleaving line set on the mother glass sheet, and the heated portion is cooled by a refrigerant, such as cooling water, jetted from a cooling unit. With this result, a thermal shock (thermal stress) is generated in the mother glass sheet, and a crack is caused to propagate along the preset cleaving line (preset cutting line) through use of the initial crack as a starting point. Thus, the mother glass sheet can be cut.

CITATION LIST

Patent Literature 1: JP 2011-116611 A

SUMMARY OF INVENTION

Technical Problem

In the laser cleaving according to Patent Literature 1, a $CO_2$ laser is used, and hence only a surface layer of the mother glass sheet is heated. Consequently, a glass film having a thickness of 0.2 mm or less is targeted. When an attempt is made to cleave a mother glass sheet having a thickness of more than 0.2 mm by the laser cleaving according to Patent Literature 1, a part in a thickness direction cannot be cleaved, and the step of applying a bending stress to the mother glass sheet to fold and separate the mother glass sheet may be required in some cases.

The present invention has been made in view of the above-mentioned circumstances and has an object to provide a method of manufacturing a glass sheet, which is capable of cleaving even a thick mother glass sheet.

Solution to Problem

According to one embodiment of the present invention, which has been devised in order to solve the above-mentioned problem, there is provided a method of manufacturing a glass sheet, comprising: an initial crack forming step of forming an initial crack on a first surface of a mother glass sheet; and a laser irradiation step of irradiating the mother glass sheet with laser light to cause a crack to propagate along a preset cleaving line through use of the initial crack as a starting point, wherein the laser irradiation step comprises irradiating a second surface of the mother glass sheet with the laser light to heat a surface layer and an inner portion of the second surface, to thereby cause, through a thermal shock caused by the heating, the crack to propagate in an entire thickness direction of the mother glass sheet while propagating along the preset cleaving line.

According to this configuration, the crack that is caused to propagate from the initial crack can be caused to propagate in the entire thickness direction of the mother glass sheet by heating the inner portion as well as the surface layer of the mother glass sheet (second surface) with laser light. As a result, even a thick mother glass sheet can be separated along the preset cleaving line without applying a bending stress to the mother glass sheet, and hence a folding and separating step can be omitted. In addition, the crack is caused to propagate with laser light, and hence the generation of microcracks on a cut surface can be suppressed, and the surface roughness of the cut surface becomes satisfactory.

As the laser light, CO laser light may be used. The CO laser light can be stably radiated to the mother glass sheet with a high output, and hence can cause the crack to stably propagate along the preset cleaving line.

According to one embodiment of the present invention, which has been devised in order to solve the above-mentioned problem, there is provided a method of manufacturing a glass sheet, comprising: an initial crack forming step of forming an initial crack on a first surface of a mother glass sheet; and a laser irradiation step of irradiating the mother glass sheet with laser light to cause a crack to propagate along a preset cleaving line through use of the initial crack as a starting point, wherein the laser irradiation step comprises irradiating a second surface of the mother glass sheet with, as the laser light, CO laser light, Er laser light, Ho laser light, or HF laser light, to thereby cause the crack to propagate in an entire thickness direction of the mother glass sheet while propagating along the preset cleaving line.

According to this configuration, CO laser light, Er laser light, Ho laser light, or HF laser light is radiated, and hence the inner portion as well as the surface layer of the mother glass sheet (second surface) can be heated with laser light. Consequently, the crack that is caused to propagate from the initial crack can be caused to propagate in the entire thickness direction of the mother glass sheet. As a result, even a thick mother glass sheet can be separated along the preset cleaving line without applying a bending stress to the mother glass sheet, and hence the folding and separating step can be omitted. In addition, the crack is caused to propagate with laser light, and hence the generation of microcracks on a cut surface can be suppressed, and the surface roughness of the cut surface becomes satisfactory.

The initial crack forming step and the laser irradiation step may each comprise supporting the first surface of the mother glass sheet with a support member. According to this configuration, the mother glass sheet can be cut without bringing the support member and other members into contact with the second surface by supporting only the first surface with the support member. As a result, when the second surface is set to a quality guarantee surface, a high-quality glass sheet can be manufactured without damaging the quality guarantee surface.

The laser light may be radiated as a circular laser spot. Herein, in the laser cleaving according to Patent Literature 1 described above, in order to ensure the amount of heat required for the cleaving, a $CO_2$ laser is radiated to the surface of the mother glass sheet in a linear shape (see paragraphs 0057 and 0059, and FIG. 1 of Patent Literature 1). For that reason, in the related-art cutting method, it was difficult to form the preset cleaving line into a curve or to efficiently cut out a relatively small glass sheet from the mother glass sheet. In contrast, in the present invention, laser light is radiated to the mother glass sheet as a circular laser spot, and hence the scannability of the laser light can be enhanced. Thus, even when the preset cleaving line comprises a curve, the laser light can be scanned along the preset cleaving line with good accuracy. Accordingly, glass sheets having a variety of shapes can be manufactured.

The laser irradiation step may comprise cooling a periphery of an irradiation position of the laser light. With this step, a thermal shock can be generated further significantly at the irradiation position of the laser light on the mother glass sheet. In addition, as described later, depending on the condition, the crack propagates under a state of slightly deviating from the preset cleaving line in some cases. In this case, this deviation can be reduced by cooling the periphery of the irradiation position of the laser light. The cooling may be performed from the back, the front, or the side of the irradiation position of the laser light, and is performed preferably from the back.

The laser irradiation step may comprise supporting the mother glass sheet with a surface plate and cooling the surface plate. When the surface plate is cooled in this manner, the first surface (surface to be brought into contact with the surface plate) of the mother glass sheet to be placed on the surface plate can be suitably cooled. In the present invention, a thermal shock can be significantly generated at the irradiation position of the laser light on the mother glass sheet by heating through irradiation with the laser light and by cooling of the mother glass sheet with the surface plate.

The laser irradiation step may comprise cooling a part of the surface plate in a vicinity of a cleaving end point of the preset cleaving line. In this case, at the cleaving end point, the crack does not easily propagate, and hence uncut portions are liable to be generated due to the stop of propagation of the crack in the mother glass sheet. The propagation of the crack can be accelerated at the cleaving end point by cooling a part of the surface plate to cool the vicinity of the cleaving end point of the mother glass sheet, with the result that the generation of the uncut portions can be prevented.

The initial crack forming step may comprise forming the initial crack in an inner region of the mother glass sheet. Herein, the inner region of the mother glass sheet refers to a region surrounded by an edge portion of the mother glass sheet and does not comprise the edge portion. With this configuration, in the initial crack forming step, it is possible to cut out glass sheets having a variety of shapes from the mother glass sheet even without forming the initial crack in the edge portion of the mother glass sheet.

In the method of manufacturing a glass sheet according to the embodiment of the present invention, the laser irradiation step may be performed under a condition in which a thermal stress GT (MPa) of the mother glass sheet calculated by the following mathematical expression 1 satisfies the following mathematical expression 2:

$$\sigma_T = \frac{E \cdot \alpha \cdot \Delta T}{2(1-\nu)} \quad \text{[Math. 1]}$$

where E represents a Young's modulus (MPa) of the mother glass sheet, α represents a thermal expansion coefficient (/K) of the mother glass sheet, ν represents a Poisson's ratio of the mother glass sheet, and ΔT represents a difference between a temperature (K) at an irradiation position of the laser light with respect to the mother glass sheet and a temperature (K) at a position away from the irradiation position; and $$40 + 60t \leq \sigma_T \leq 90 + 60t \quad \text{[Math. 2]}$$

where "t" represents a thickness (mm) of the mother glass sheet.

Advantageous Effects of Invention

According to the present invention, even a thick mother glass sheet can be cleaved.

DESCRIPTION OF EMBODIMENTS

Embodiments of the present invention are described below with reference to the drawings. In each of FIG. 1 to FIG. 5, there is illustrated a method of manufacturing a glass sheet according to a first embodiment of the present invention.

This method comprises a cleaving step of cleaving a mother glass sheet MG to form one or more glass sheets. The mother glass sheet MG is formed into a rectangular shape by cutting a glass ribbon, which is continuously formed in a band shape by a down-draw method, such as an overflow down-draw method, or a float method, in a width direction. The thickness of the mother glass sheet MG may be set to from 0.05 mm to 5 mm. From the viewpoint of attaining the effect of being capable of cleaving even the thick mother glass sheet MG, the thickness of the mother glass sheet MG is preferably more than 0.1 mm, more preferably more than 0.2 mm, still more preferably 0.3 mm or more. Meanwhile, the thickness of the mother glass sheet MG is preferably set to 3 mm or less.

Examples of a material for the mother glass sheet MG include silicate glass, silica glass, borosilicate glass, soda glass, soda lime glass, aluminosilicate glass, and alkali-free glass. Herein, the alkali-free glass refers to glass that is substantially free of an alkali component (alkali metal oxide), specifically glass having a weight ratio of the alkali component of 3,000 ppm or less. The weight ratio of the alkali component in the present invention is preferably 1,000 ppm or less, more preferably 500 ppm or less, most preferably 300 ppm or less. The mother glass sheet MG may be chemically strengthened glass, and in this case, aluminosilicate glass may be used.

Figure 1:
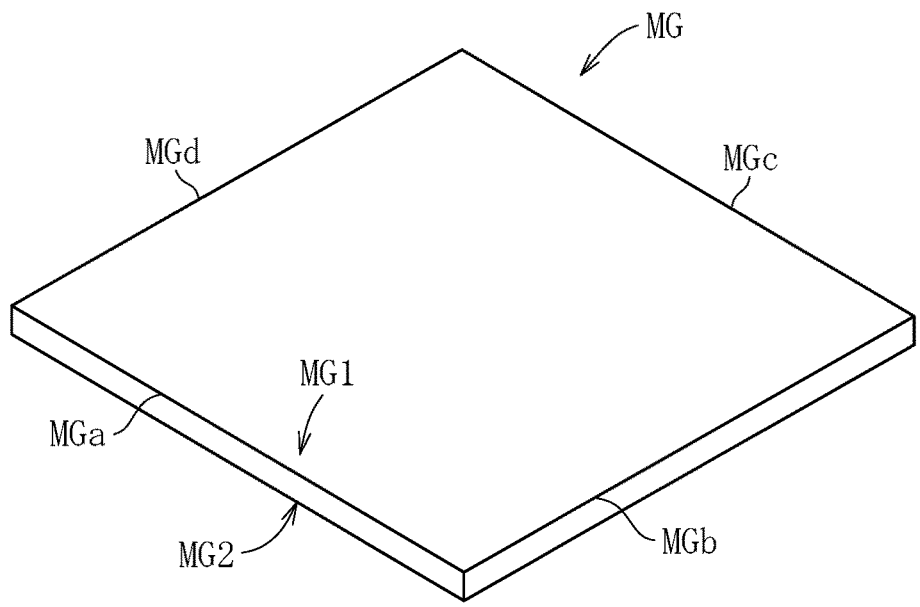
FIG. 1 is a perspective view of a mother glass sheet.

In the first embodiment, there is exemplified the mother glass sheet MG having a rectangular shape, but the shape of the mother glass sheet MG is not limited to the first embodiment. As illustrated in FIG. 1, the mother glass sheet MG comprises a first surface MG1, a second surface MG2, and an edge portion formed of first to fourth sides MGa to MGd. In the first embodiment, description is given of a manufacturing method when the second surface MG2 is set to a surface (quality guarantee surface) to be a product and the first surface MG1 is set to a non-product surface (non-guaranteed surface).

The cleaving step comprises an initial crack forming step and a laser irradiation step.

Figure 2:
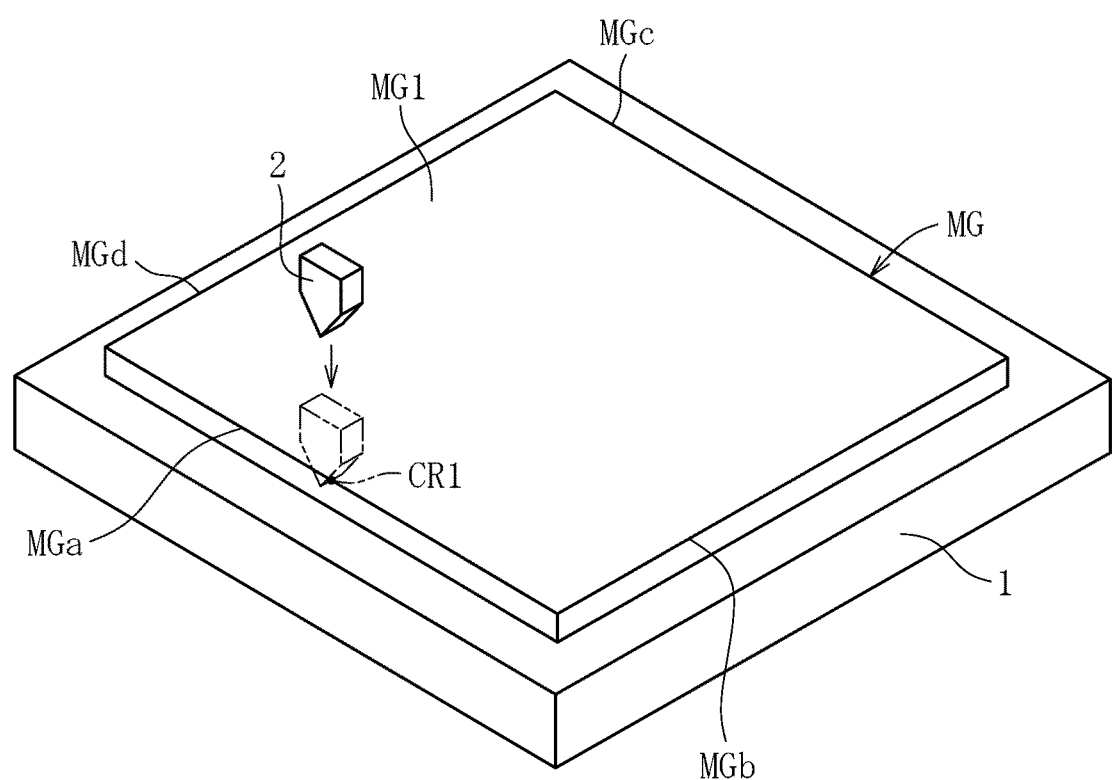
FIG. 2 is a perspective view for illustrating an initial crack forming step according to a first embodiment.

As illustrated in FIG. 2, in the initial crack forming step, the mother glass sheet MG is placed on a surface plate 1 serving as a support member. The first surface MG1 of the mother glass sheet MG faces upward, and the second surface MG2 is supported by the surface plate 1. In this case, a protective sheet made of a foam sheet or the like may be interposed between the second surface MG2 of the mother glass sheet MG and the surface plate 1.

As illustrated in FIG. 2, in the initial crack forming step, an initial crack CR1 is formed on a part of the first surface MG1 of the mother glass sheet MG by a crack forming device 2. The crack forming device 2 is formed of a pointed scriber, such as a sintered diamond cutter, but is not limited thereto. The crack forming device 2 may be formed of a diamond pen, a cemented carbide cutter, sandpaper, or the like. In the initial crack forming step, the crack forming device 2 is lowered from above the mother glass sheet MG to be brought into contact with the first side MGa of the edge portion of the mother glass sheet MG.

When the initial crack CR1 is formed, the mother glass sheet MG is inverted and placed on the surface plate 1 again. In this state, as illustrated in FIG. 3, the second surface MG2 of the mother glass sheet MG faces upward, and the first surface MG1 is supported by the surface plate 1.

Figure 3:
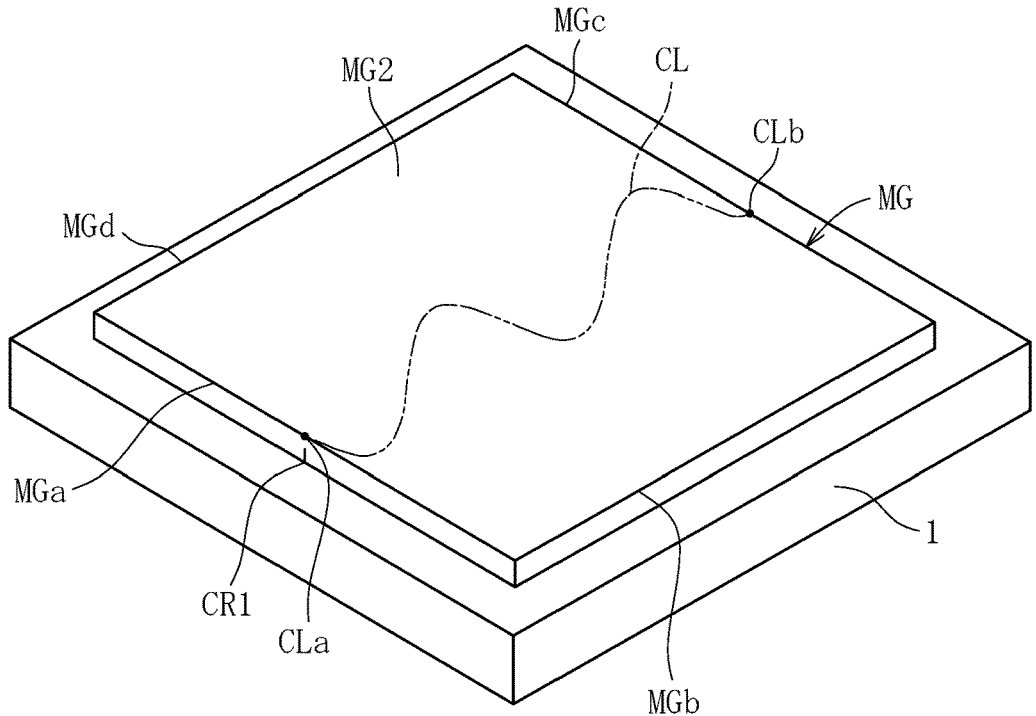
FIG. 3 is a perspective view for illustrating a laser irradiation step.

As illustrated in FIG. 3, a curved preset cleaving line CL is imaginarily set on the mother glass sheet MG. The preset cleaving line CL has a cleaving start point CLa set in one end portion thereof and a cleaving end point CLb set in the other end portion thereof. The cleaving start point CLa and the cleaving end point CLb are each formed in the edge portion of the mother glass sheet MG. Specifically, the cleaving start point CLa is set in a midway portion of the first side MGa of the edge portion of the mother glass sheet MG. The cleaving endpoint CLb is set in a midway portion of the third side MGc of the edge portion of the mother glass sheet MG. In addition, the position of the cleaving start point CLa corresponds to the position of the initial crack CR1 formed on the first surface MG1.

Figure 4:
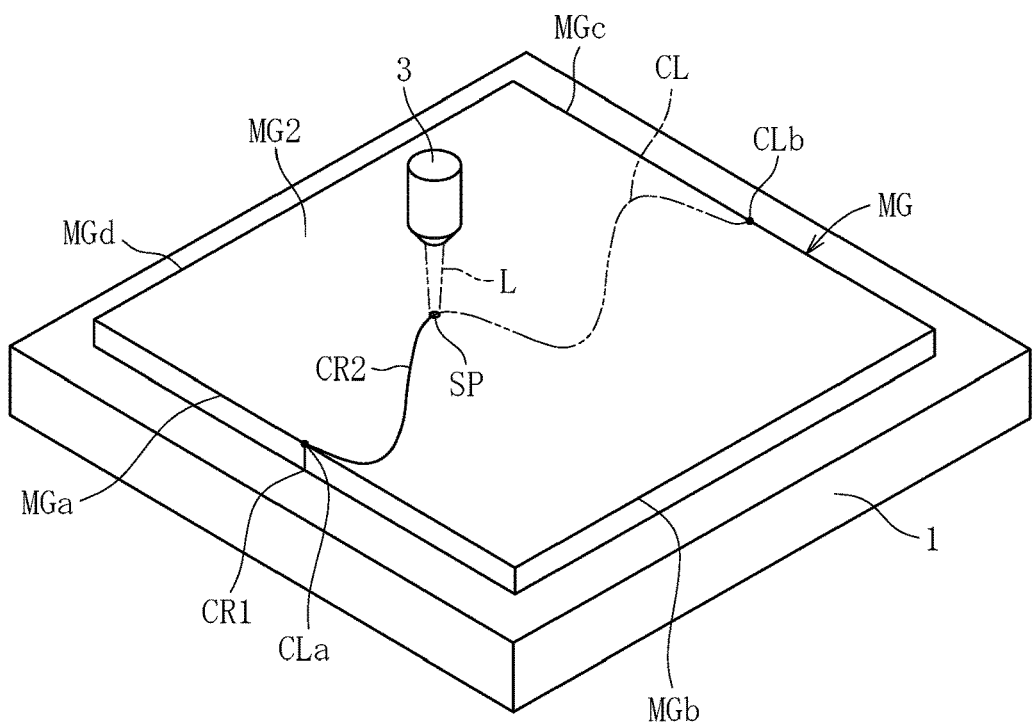
FIG. 4 is a perspective view for illustrating the laser irradiation step.

As illustrated in FIG. 4, in the laser irradiation step, laser light L is radiated to the second surface MG2 of the mother glass sheet MG by a laser irradiation device 3 so as to correspond to the initial crack CR1 on the first surface MG1 side, and the laser light L is scanned along the preset cleaving line CL. Specifically, the laser irradiation device 3 is configured to be three-dimensionally movable, and moves above the mother glass sheet MG placed on the surface plate 1 in a predetermined direction, to thereby scan the laser light L from the cleaving start point CLa to the cleaving end point CLb along the preset cleaving line CL. With this configuration, as illustrated in FIG. 4, a crack CR2 starting from the initial crack CR1 propagates along the preset cleaving line CL. In addition, the crack CR2 propagates in the entire thickness direction of the mother glass sheet MG, and propagates to the second surface MG2 positioned on an opposite side to the first surface MG1.

The laser light L radiated from the laser irradiation device 3 is preferably a CO laser, an Er laser (Er:YAG laser), a Ho laser (Ho:YAG laser), or a HF laser. The laser light L may be pulse laser light or continuous laser light. When the CO laser light is used as the laser light, the wavelength thereof is set to preferably from 5.25 μm to 5.75 μm.

Figure 5:
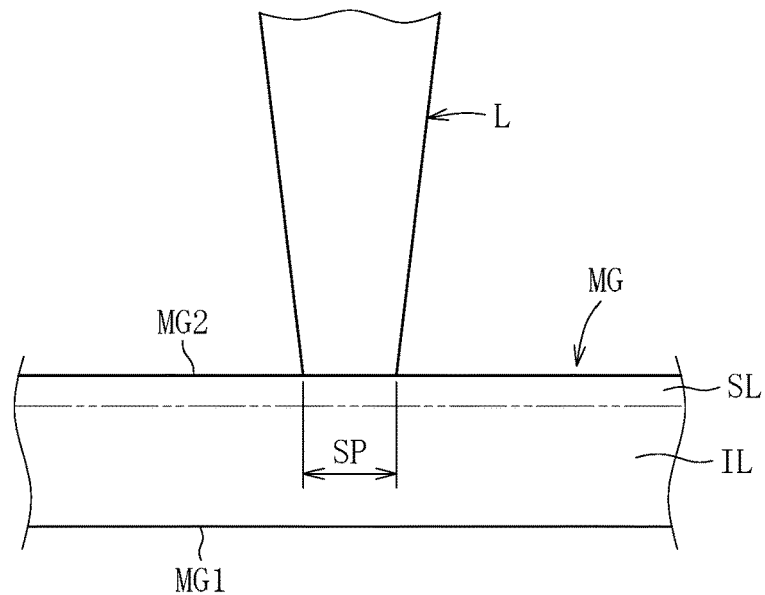
FIG. 5 is a side view of the mother glass sheet.

As illustrated in FIG. 4 and FIG. 5, the laser irradiation device 3 irradiates the second surface MG2 of the mother glass sheet MG with the laser light L so that a circular laser spot SP is formed. The irradiation diameter (spot diameter) of the laser light L is preferably from 1 mm to 8 mm, more preferably from 2 mm to 6 mm. The laser light L may be radiated to the mother glass sheet MG in a state of being defocused.

When $CO_2$ laser light is used as in the related art, only a surface layer SL (for example, a range from the second surface MG2 to a depth of about 10 μm) of the mother glass sheet MG (second surface MG2) is heated. Because of this, it is difficult to cause the initial crack CR1 formed on the first surface MG1 to propagate to the second surface MG2, and as a result, it is also difficult to cause the initial crack CR1 to propagate along the preset cleaving line CL. When the initial crack CR1 is formed on the second surface MG2, a thermal shock sufficient for cleaving can be generated by setting the irradiation mode of the $CO_2$ laser light to an elongated shape (linear or elliptical shape) along the preset cleaving line CL, or cooling the mother glass sheet MG with a refrigerant, such as cooling water.

In contrast, in the method of manufacturing a glass sheet according to the first embodiment, through use of the CO laser light L or the like that can be stably radiated with a high output, an inner portion IL (for example, a range from a depth of about 10 μm to a depth of about 3,000 μm) as well as the surface layer SL of the mother glass sheet MG can be heated even with the circular laser spot SP, and the amount of heat sufficient for generating a thermal shock (thermal stress) can be applied to the mother glass sheet MG. Because of this, the initial crack CR1 formed on the first surface MG1 propagates to the second surface MG2. In addition, the initial crack CR1 propagates along the preset cleaving line CL in association with scanning of the laser light L along the preset cleaving line CL. In the present invention, the surface layer SL of the mother glass sheet MG refers to a layer extending from the second surface MG2 of the mother glass sheet MG to a depth of 10 μm. The inner portion IL of the mother glass sheet MG refers to a region having a depth of more than 10 μm from the second surface MG2 (see FIG. 5).

In Tables 1 and 2 below, there is shown an average transmittance of each of the mother glass sheets MG when a plurality of types of mother glass sheets MG each having a predetermined thickness are irradiated with a CO laser and a $CO_2$ laser.

TABLE 1

| Type of glass | Alkali-free | Alkali-free | Borosilicate | Soda | Soda |
|---|---|---|---|---|---|
| Thermal expansion coefficient ($\times 10^{-7}$/K.) | 38 | 45 | 66 | 90 | 91 |

TABLE 1-continued

| Type of glass | Alkali-free | Alkali-free | Boro-silicate | Soda | Soda |
|---|---|---|---|---|---|
| Thickness (mm) | 0.5 | 0.5 | 0.5 | 0.5 | 0.5 |
| Average transmittance (%) (Wavelength: 5.25 μm to 5.75 μm) | 0.2 | 0.2 | 0.1 | 0.9 | 0.9 |
| Average transmittance (%) (Wavelength: 10.6 μm) | 0 | 0 | 0 | 0 | 0 |

TABLE 2

| Type of glass | Alkali-free | Alkali-free | Alkali-free | Alkali-free | Alkali-free |
|---|---|---|---|---|---|
| Thermal expansion coefficient ($\times 10^{-7}$/K.) | 38 | 38 | 38 | 38 | 38 |
| Thickness (mm) | 0.1 | 0.2 | 0.5 | 0.7 | 1.1 |
| Average transmittance (%) (Wavelength: 5.25 μm to 5.75 μm) | 26.8 | 7.4 | 0.2 | 0.05 | 0.01 |
| Average transmittance (%) (Wavelength: 10.6 μm) | 0 | 0 | 0 | 0 | 0 |

As shown in Tables 1 and 2, the wavelength of the CO laser has a peak in the vicinity of from 5.25 μm to 5.75 μm, and the average transmittance of each of the various mother glass sheets MG at this wavelength is not zero. That is, the radiated CO laser is not entirely absorbed on the second surface MG2 of the mother glass sheet MG, but is partially absorbed inside the mother glass sheet MG, and the remaining portion is transmitted through the mother glass sheet MG. As a result, with the CO laser, the inner portion of the mother glass sheet MG as well as the second surface MG2 of the mother glass sheet MG can be heated.

Meanwhile, the wavelength of the $CO_2$ laser has a peak in the vicinity of 10.6 μm, and the average transmittance of each of the various mother glass sheets MG in the vicinity of this wavelength is zero. In this case, most of the radiated $CO_2$ laser is absorbed on the second surface MG2 of the mother glass sheet MG, and is not absorbed inside the mother glass sheet MG. Consequently, the inner portion of the mother glass sheet MG cannot be heated by the $CO_2$ laser.

In the method of manufacturing a glass sheet according to the first embodiment, the crack CR2 is caused to propagate in the thickness direction by heating the inner portion IL as well as the surface layer SL of the mother glass sheet MG. With this result, the mother glass sheet MG can be separated along the preset cleaving line CL without applying a bending stress to the mother glass sheet MG, and hence a folding and separating step can be omitted. In addition, it becomes possible to cut the mother glass sheet MG without cooling the mother glass sheet MG with a refrigerant as in the related art. From the viewpoint of accelerating the propagation of the crack CR2, it is preferred that the irradiation part of the laser light L and the periphery thereof be cooled by jetting a refrigerant from a nozzle as in a second embodiment described later. From the viewpoint of simplifying the configuration of the laser irradiation device 3, it is preferred that the mother glass sheet MG be cut without cooling the irradiation part of the laser light L and the periphery thereof by jetting a refrigerant.

In addition, when the laser light L is radiated so that the circular laser spot SP is formed, the mother glass sheet MG can be suitably cut even when the preset cleaving line CL is formed into a curved shape. With this result, glass sheets having a further variety of shapes can be cut out from the mother glass sheet MG.

Figure 6:
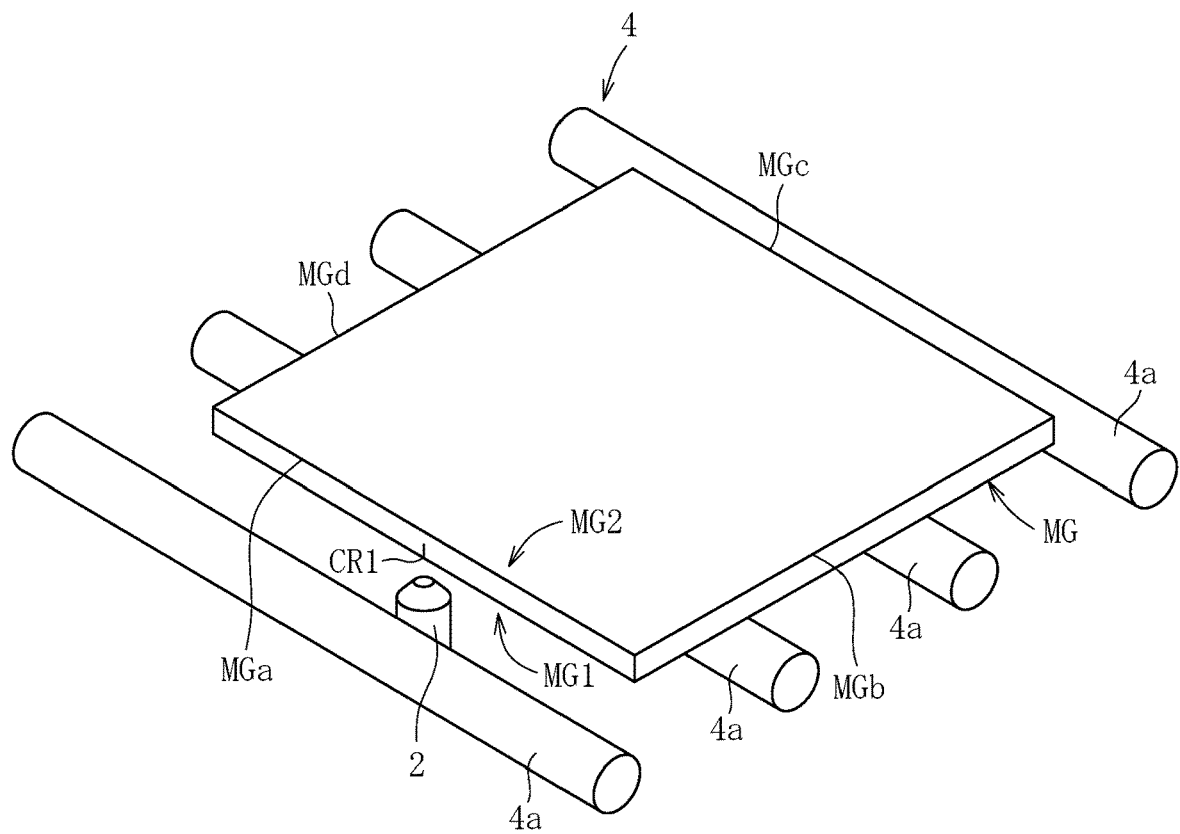
FIG. 6 is a perspective view for illustrating an initial crack forming step according to a second embodiment.
Figure 7:
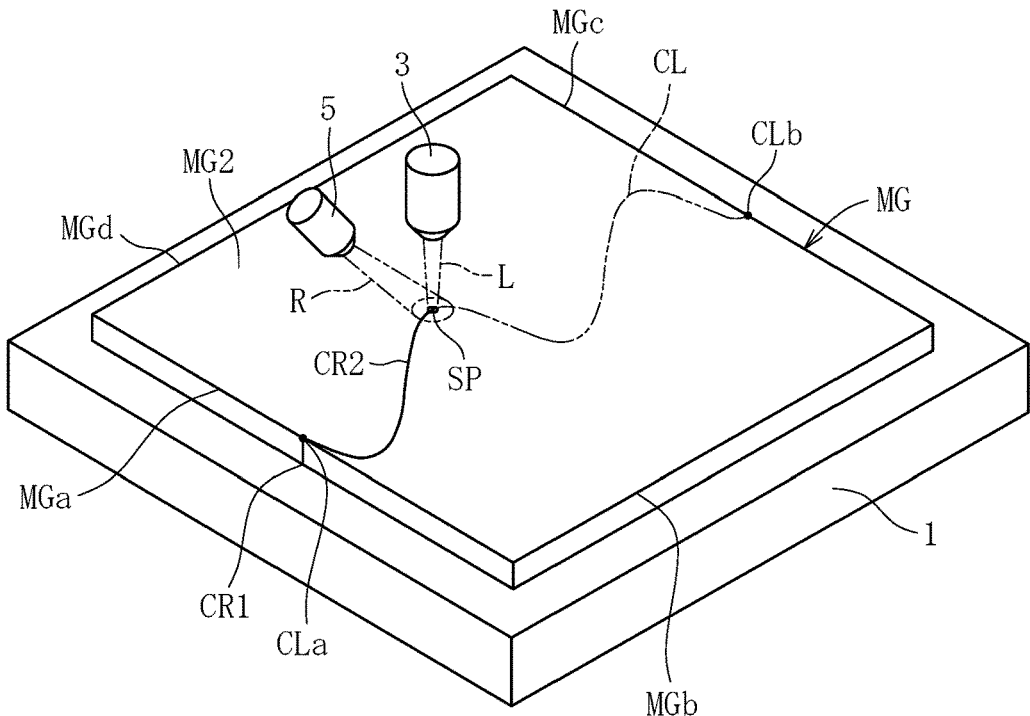
FIG. 7 is a perspective view for illustrating a laser irradiation step.

In FIG. 6 and FIG. 7, there is illustrated a method of manufacturing a glass sheet according to a second embodiment of the present invention. In the above-mentioned first embodiment, in the initial crack forming step, the initial crack CR1 is formed on the first surface MG1 under a state in which the second surface MG2 of the mother glass sheet MG is supported by the support member (surface plate 1). However, in the second embodiment, the initial crack CR1 is formed on the first surface MG1 under a state in which the first surface MG1 is supported by the support member.

As illustrated in FIG. 6, the initial crack forming step is performed during conveyance of the mother glass sheet MG by a conveying device 4. The conveying device 4 is formed of a plurality of conveyance rollers 4a. However, the conveying device 4 is not limited to this configuration, and may be formed of a conveyor belt or another device.

As illustrated in FIG. 6, the crack forming device 2 similar to that in the above-mentioned first embodiment is arranged at a position below the conveyance rollers 4a. In the initial crack forming step, under a state in which the first surface MG1 of the mother glass sheet MG is supported by the conveyance rollers 4a, the initial crack CR1 is formed on a part of the first surface MG1 (for example, the first side MGa of the edge portion) by the crack forming device 2. The mother glass sheet MG is placed on the surface plate 1 (support member) after being conveyed to a predetermined position by the conveyance rollers 4a. The surface plate 1 supports the first surface MG1 of the mother glass sheet MG (see FIG. 7).

As illustrated in FIG. 7, in the laser irradiation step according to the second embodiment, the periphery of the irradiation part (laser spot SP) of the laser light L by the laser irradiation device 3 is cooled with the refrigerant R (for example, air) jetted from a cooling device 5.

The cooling device 5 is configured to move following the laser irradiation device 3. The cooling device 5 jets the refrigerant R from a nozzle thereof toward the irradiation part (laser spot SP) of the laser light L and the periphery thereof. As the refrigerant R, an inert gas, such as He or Ar, or a $N_2$ gas that is non-oxidizing is suitably used in addition to air. In the second embodiment, through cooling of the irradiation part of the laser light L and the periphery thereof with the refrigerant R, a thermal shock for causing the crack CR2 to propagate can be more significantly generated. When a CO laser is used, CO laser light absorbs moisture, and hence the output of the CO laser is attenuated by the moisture. As a result, it is better not to use water as the refrigerant R. However, this is not the case when the output attenuation is effectively used.

The laser irradiation device 3 and the cooling device 5 may be integrally formed. For example, a jetting port of the nozzle of the cooling device 5 may be formed into an annular shape, and the laser irradiation device 3 may be arranged on an inner side of the jetting port having an annular shape.

Herein, depending on the cutting condition, the crack CR2 may propagate under a state of slightly deviating from the preset cleaving line CL in some cases. In this case, this deviation can be reduced by cooling the periphery of the irradiation part (laser spot SP) of the laser light L. The cooling may be performed from the back, the front, or the side of the irradiation part (laser spot SP) of the laser light L, and is preferably performed from the back as illustrated in FIG. 7 from the viewpoint of further reducing the deviation. The front, the back, and the side are based on a scanning direction (traveling direction) of the laser light L. For example, performing cooling from the front means that cooling is performed through use of the cooling device 5 arranged on the cleaving end point CLb side with respect to the laser spot SP (laser irradiation device 3). In addition, performing cooling from the back means that cooling is performed through use of the cooling device 5 arranged on the cleaving start point CLa side with respect to the laser spot SP (laser irradiation device 3).

The jetting range of the refrigerant R by the nozzle of the cooling device 5 may not overlap the laser spot SP. That is, the refrigerant R may be jetted to a position away from the laser spot SP. From the viewpoint of further reducing the deviation of the crack CR2, the distance between the jetting range of the refrigerant R by the nozzle of the cooling device 5 and the laser spot SP is preferably shorter, and the jetting range of the refrigerant R more preferably overlaps the laser spot SP partially or entirely. Herein, the jetting range of the refrigerant R by the nozzle means a range which the refrigerant R jetted from the nozzle directly reaches and cools the mother glass sheet MG, and excludes the case in which the refrigerant R that is brought into contact with the mother glass sheet MG and changed in flow direction indirectly reaches and cools the laser spot SP.

From the viewpoint of further reducing the deviation of the crack CR2 from the preset cleaving line CL, it is preferred that the scanning speed of the laser light L be low. For example, in the case where the material for the mother glass sheet MG is alkali-free glass, when the thickness is 0.4 mm or more, the scanning speed of the laser light L is set to preferably from 3 mm/sec to 15 mm/sec. When the thickness is less than 0.4 mm, the scanning speed is set to preferably from 3 mm/sec to 100 mm/sec. A preferred scanning speed of the laser light L varies depending on the material for the mother glass sheet MG, and tends to increase along with an increase in thermal expansion coefficient. In addition, a preferred scanning speed of the laser light L tends to increase along with a decrease in thickness of the mother glass sheet MG. The flow rate of the refrigerant R jetted from the nozzle may be set to, for example, from 10 l/min to 50 l/min.

Figure 8:
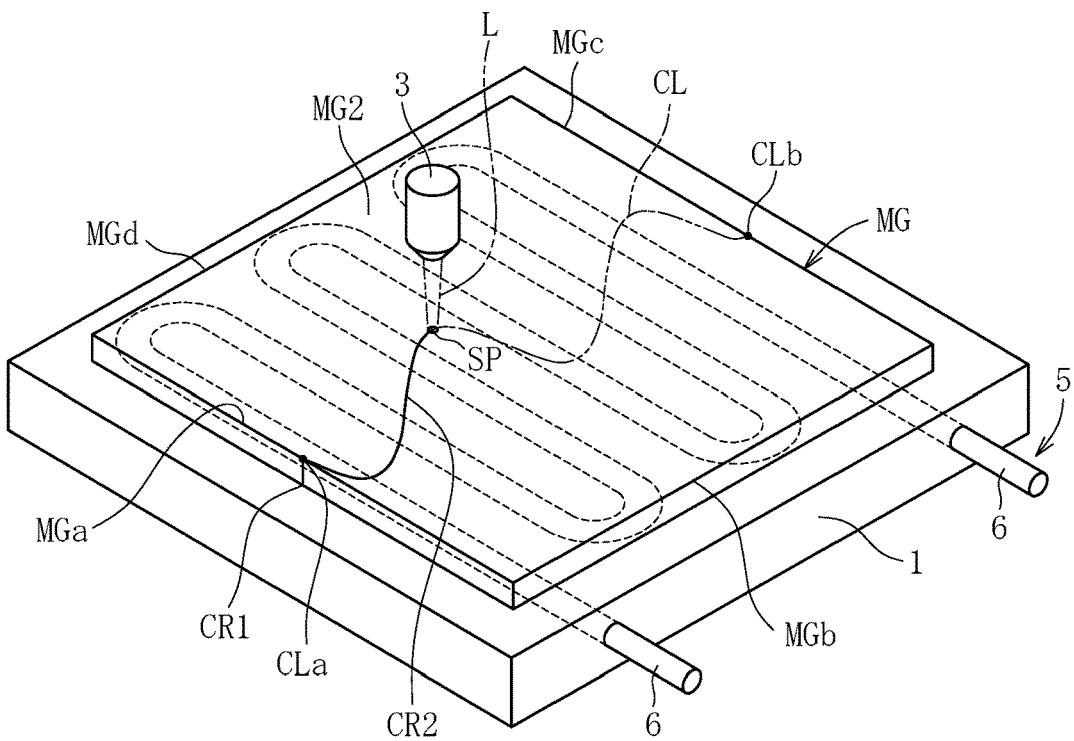
FIG. 8 is a perspective view for illustrating a laser irradiation step according to a third embodiment.

In FIG. 8, there is illustrated a method of manufacturing a glass sheet according to a third embodiment of the present invention. The third embodiment is different from the second embodiment in configuration of the cooling device 5. The cooling device 5 according to the third embodiment is provided in the surface plate 1. The cooling device 5 comprises a refrigerant pipe 6 arranged in or on a lower surface of the surface plate 1. The refrigerant pipe 6 is arranged in a meandering manner so as to cool the surface plate 1 in a wide range. In the third embodiment, in the laser irradiation step, the surface plate 1 is cooled by causing a refrigerant made of a gas or a liquid to flow through the refrigerant pipe 6. With this step, the first surface MG1 of the mother glass sheet MG brought into contact with surface plate 1 is cooled. In the third embodiment, the first surface MG1 of the mother glass sheet MG that is supported by the surface plate 1 can be cooled almost entirely, and hence the propagation of the crack CR2 in the thickness direction can be accelerated.

Figure 9:
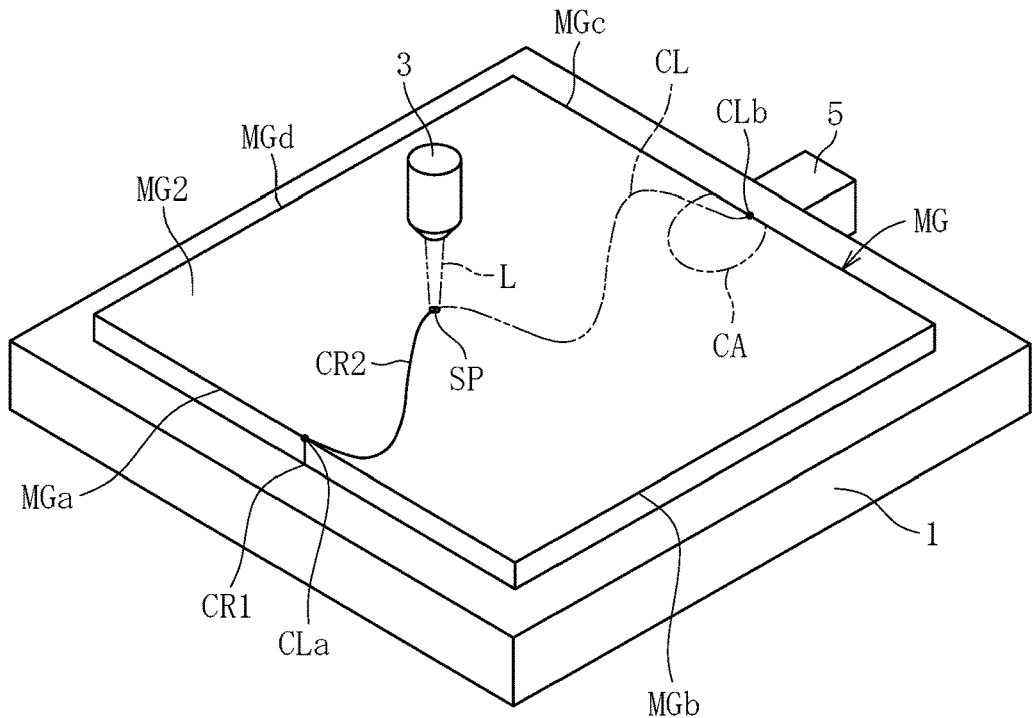
FIG. 9 is a perspective view for illustrating a laser irradiation step according to a fourth embodiment.

In FIG. 9, there is illustrated a method of manufacturing a glass sheet according to a fourth embodiment of the present invention. The fourth embodiment is different from the third embodiment in configuration of the cooling device 5. The cooling device 5 according to the fourth embodiment is configured to cool a part of the surface plate 1. The cooling device 5 is provided on a part of the surface plate 1 in the vicinity of the cleaving end point CLb so as to cool the cleaving end point CLb of the preset cleaving line CL set on the mother glass sheet MG and a peripheral region CA thereof. Herein, in the vicinity of the cleaving endpoint CLb, the area for heating the glass in a cutting area is reduced, and the heating by the laser light L becomes insufficient. As a result, it is difficult to apply a thermal shock sufficient for causing the crack CR2 to propagate, and hence uncut portions are liable to be generated. According to the fourth embodiment, the propagation of the crack CR2 can be accelerated at the cleaving endpoint CLb, and the generation of uncut portions can be prevented.

Figure 10:
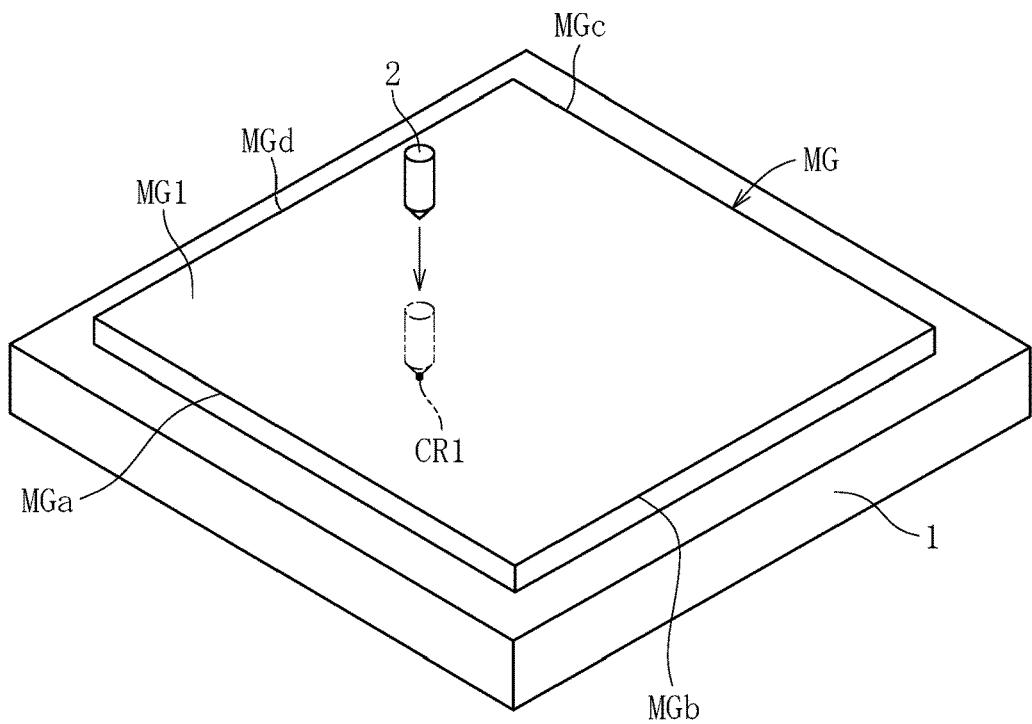
FIG. 10 is a perspective view for illustrating an initial crack forming step according to a fifth embodiment.
Figure 11:
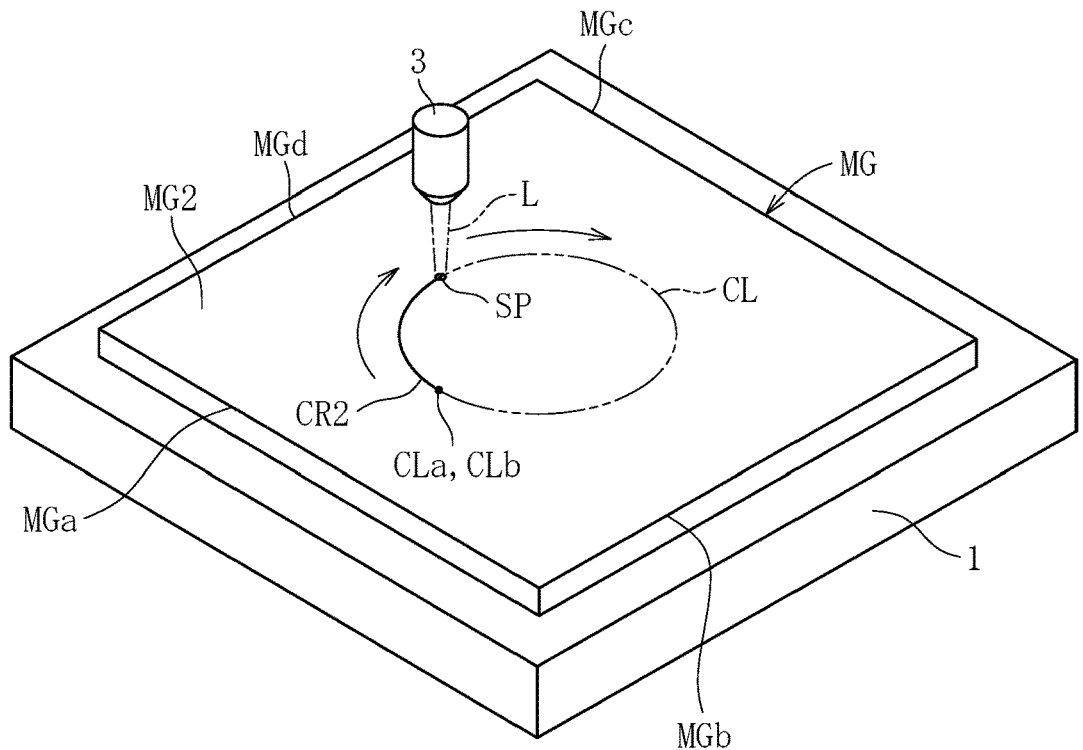
FIG. 11 is a perspective view for illustrating a laser irradiation step.

In each of FIG. 10 and FIG. 11, there is illustrated a method of manufacturing a glass sheet according to a fifth embodiment of the present invention. In the fifth embodiment, in the initial crack forming step, the initial crack CR1 is formed in the inner region of the second surface MG2 of the mother glass sheet MG instead of the edge portion (first side MGa) of the mother glass sheet MG. Herein, the inner region refers to a region surrounded by the edge portion (four sides MGa to MGd) of the mother glass sheet MG, and the edge portion (first side MGa to fourth side MGd) of the mother glass sheet MG is not comprised in the inner region.

As illustrated in FIG. 10, the circular preset cleaving line CL is set in the inner region of the mother glass sheet MG. In this case, in the initial crack forming step, the crack forming device 2 (for example, a scriber) is brought into contact with an arbitrary point on the preset cleaving line CL on the first surface MG1 of the mother glass sheet MG to form the initial crack CR1. After that, the mother glass sheet MG is inverted to cause the second surface MG2 to face upward, and the first surface MG1 is supported by the surface plate 1.

As illustrated in FIG. 11, in the laser irradiation step, on the second surface MG2 of the mother glass sheet MG, the CO laser light L is radiated to the cleaving start point CLa corresponding to the initial crack CR1 on the first surface MG1 side, and the CO laser light L is scanned along the preset cleaving line CL to reach the cleaving end point CLb, to thereby cause the crack CR2 to propagate in a circular shape. As a result, a circular glass sheet can be cut out from the rectangular mother glass sheet MG.

The present invention is not limited to the configurations of the above-mentioned embodiments. In addition, the action and effect of the present invention are not limited to those described above. The present invention may be modified in various forms within the range not departing from the spirit of the present invention.

In each of the above-mentioned embodiments, there has been given the example in which laser light is radiated to the mother glass sheet as a circular laser spot, but the present invention is not limited to this configuration. The laser spot may have, for example, an elliptical shape, an oval shape, a rectangular shape, or a linear shape. From the viewpoint of increasing the scannability of laser light so as to manufacture glass sheets having various shapes, such as a curved shape, it is preferred that the laser spot be a circular laser spot. However, even when the laser spot has a shape other than the circular shape, as long as the long diameter of the shape is 10 mm or less, the mother glass sheet can be cut to an arbitrary shape by providing an angle adjusting mechanism of laser light so that the long diameter is constantly oriented in a tangent direction with respect to the preset cleaving line.

In the above-mentioned second embodiment, there has been given the example in which the initial crack CR1 is formed on the first surface MG1 under a state in which the first surface MG1 of the mother glass sheet MG is supported by the conveyance rollers 4a of the conveying device 4, but the present invention is not limited to this configuration. For example, the initial crack CR1 may be formed on the first surface MG1 by the crack forming device 2 (scriber or the like) from the lower side of the surface plate 1 under a state in which the first surface MG1 of the mother glass sheet MG is supported by the surface plate 1. In this case, it is desired that the portion of the mother glass sheet MG on which the initial crack CR1 is formed be exposed from the surface plate 1. The surface plate 1 may be formed of, for example, a plurality of constituent members, may be formed in a grid pattern, or may be provided with an opening.

EXAMPLES

Examples according to the present invention are described below, but the present invention is not limited to Examples.

The inventors of the present invention performed a cutting test of a glass sheet through use of a laser irradiation device. In this test, a plurality of mother glass sheets having different thicknesses were each continuously irradiated with CO laser light under different conditions (output, scanning speed, irradiation diameter), and each of the mother glass sheets was cleaved into small glass sheets along a preset cleaving line formed into a curved shape. In this cutting test, alkali-free glass, soda glass, and borosilicate glass were used as samples for the mother glass sheets. In the cutting test, all the mother glass sheets were able to be satisfactorily cleaved through use of CO laser light.

In addition, for example, a thermal stress $\sigma_T$ (MPa) when the mother glass sheet having a thickness of 0.5 mm was cut was calculated by the following mathematical expression 1. The calculation results are shown in Table 3.

$$\sigma_T = \frac{E \cdot \alpha \cdot \Delta T}{2(1-\nu)} \qquad \text{[Math. 1]}$$

where E represents a Young's modulus (MPa) of the mother glass sheet, $\alpha$ represents a thermal expansion coefficient (/K) of the mother glass sheet, $\nu$ represents a Poisson's ratio of the mother glass sheet, and $\Delta T$ represents a difference between a temperature (K) at an irradiation position of the laser light with respect to the mother glass sheet and a temperature (K) at a position away from the irradiation position.

TABLE 3

| Type of glass | Alkali-free | Alkali-free | Boro-silicate | Soda | Soda |
|---|---|---|---|---|---|
| Young's modulus (GPa) | 73 | 80 | 77 | 73 | 70 |

TABLE 3-continued

| Type of glass | Alkali-free | Alkali-free | Boro-silicate | Soda | Soda |
|---|---|---|---|---|---|
| Thermal expansion coefficient ($\times 10^{-7}$/K.) | 38 | 45 | 66 | 90 | 91 |
| Poisson's ratio | 0.2 | 0.2 | 0.2 | 0.2 | 0.2 |
| Thickness (mm) | 0.5 | 0.5 | 0.5 | 0.5 | 0.55 |
| Output (W) | 38 | 38 | 38 | 38 | 38 |
| Speed (mm/sec) | 20 | 40 | 70 | 90 | 90 |
| Irradiation diameter (mm) | 6 | 6 | 6 | 6 | 6 |
| $\Delta T$ (K.) | 550 | 420 | 320 | 250 | 260 |
| $\sigma_T$ (MPa) | 95 | 95 | 102 | 103 | 104 |

As shown in Table 3, in order to obtain a satisfactory cut surface with a mother glass sheet having a thickness of about 0.5 mm, it is desired that a thermal stress $\sigma_T$ of about 100 MPa be applied to the mother glass sheet at the time of cutting regardless of the type of glass.

Figure 12:
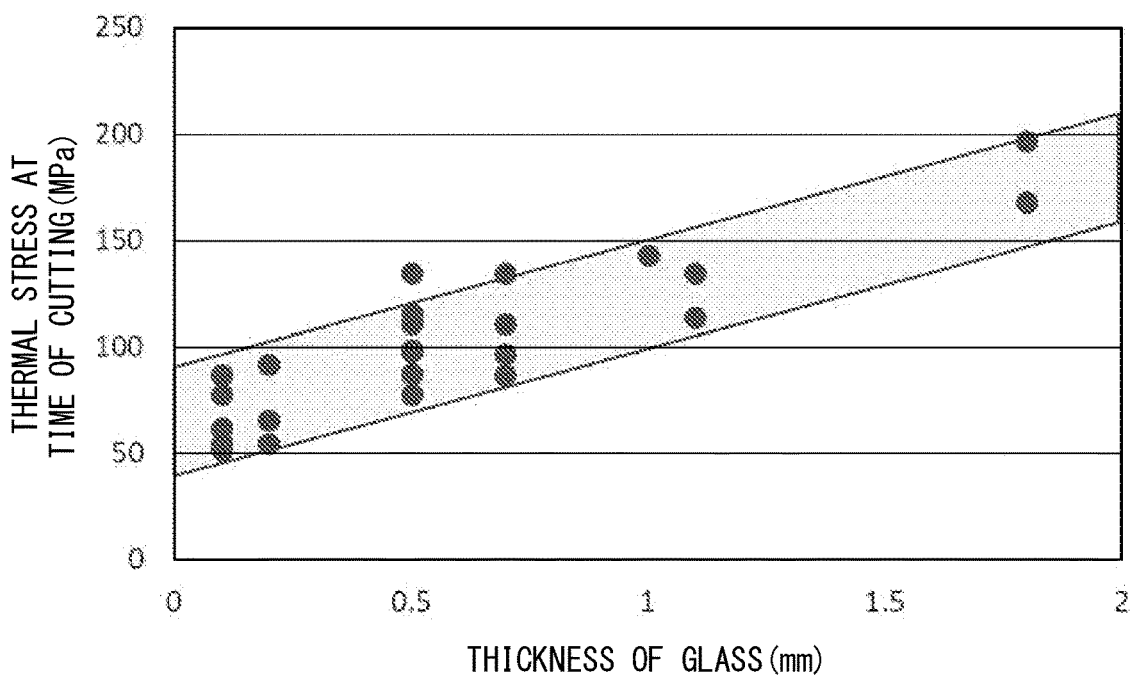
FIG. 12 is a graph for showing a relationship between a thermal stress and the thickness of a glass sheet.

The thermal stress $\sigma_T$ for obtaining an appropriate cut surface varies depending on the thickness of the mother glass sheet. The inventors of the present invention have conducted a test in which a plurality of mother glass sheets having different thicknesses were cut with a CO laser, and have determined the relationship between the thickness of the mother glass sheet and thermal stress. In FIG. 12, there is shown the relationship between the thickness of the mother glass sheet and the thermal stress in the cutting test. Under the test conditions shown in FIG. 12, satisfactory cut surfaces were able to be obtained in all the cases.

From the test results, the inventors of the present invention have found that it is desired that, in order to obtain a satisfactory cut surface when a mother glass sheet is cut with a CO laser, the laser irradiation step be performed so that the thermal stress $\sigma_T$ (MPa) of the mother glass sheet calculated by the above-mentioned mathematical expression 1 satisfies the following mathematical expression 2.

$$40 + 60t \leq \sigma_T \leq 90 + 60t \qquad \text{[Math. 2]}$$

where "t" represents a thickness (mm) of the mother glass sheet.

Regarding the temperature measurement of the mother glass sheet, the upper surface temperature of the mother glass sheet was measured by glass temperature measurement thermography (P I450G7 manufactured by Optris) at each of an irradiation position of laser light and a separation position that was separated by 10 mm forward from the irradiation position. The difference between the temperature at the irradiation position of the laser light and the temperature at the separation position separated from the irradiation position was defined as the above-mentioned temperature difference $\Delta T$. The temperature of the mother glass sheet during irradiation of the laser light was changed by changing the output and the processing speed condition. The temperature at the separation position was substantially the same as room temperature.

REFERENCE SIGNS LIST 1 surface plate (support member)
4a conveyance roller (support member)
CL preset cleaving line
CR1 initial crack
CR2 crack
IL inner portion of mother glass sheet
L laser light
MG mother glass sheet MG1 first surface
MG2 second surface
SL surface layer of mother glass sheet (second surface)
SP laser spot

The invention claimed is:

1. A method of manufacturing a glass sheet, comprising:
an initial crack forming step of forming an initial crack on a first surface of a mother glass sheet; and
a laser irradiation step of irradiating the mother glass sheet with laser light to cause a crack to propagate along a preset cleaving line through use of the initial crack as a starting point,
wherein in the initial crack forming step, the initial crack is formed on the first surface at only a cleaving start point of the preset cleaving line,
wherein the laser irradiation step comprises irradiating a second surface of the mother glass sheet, which is opposite to the first surface, with, as the laser light, CO laser light, Er laser light, Ho laser light, or HF laser light, to thereby cause the crack to propagate in an entire thickness direction of the mother glass sheet while propagating along the preset cleaving line,
wherein the preset cleaving line also has a cleaving end point where the initial crack is not present on the first surface, and
wherein the laser irradiation step comprises irradiating the second surface of the mother glass sheet with the laser light starting at a position on the second surface that is opposite to a location of the initial crack on the first surface, and then irradiating the second surface of the mother glass sheet along the preset cleaving line beyond an end of the initial crack on the first surface to the cleaving end point.

2. A method of manufacturing a glass sheet, the method comprising:
an initial crack forming step of forming an initial crack on a first surface of a mother glass sheet; and
a laser irradiation step of irradiating the mother glass sheet with laser light to cause a crack to propagate along a preset cleaving line through use of the initial crack as a starting point,
wherein in the initial crack forming step, the initial crack is formed on the first surface at only a cleaving start point of the preset cleaving line,
wherein the laser irradiation step comprises irradiating a second surface of the mother glass sheet, which is opposite to the first surface, with the laser light to heat a surface layer and an inner portion of the second surface, to thereby cause, through a thermal shock caused by the heating, the crack to propagate in an entire thickness direction of the mother glass sheet while propagating along the preset cleaving line,
wherein the preset cleaving line also has a cleaving end point where the initial crack is not present on the first surface, and
wherein the laser irradiation step comprises irradiating the second surface of the mother glass sheet with the laser light starting at a position on the second surface that is opposite to a location of the initial crack on the first surface, and then irradiating the second surface of the mother glass sheet along the preset cleaving line beyond an end of the initial crack on the first surface to the cleaving end point.

3. The method of manufacturing a glass sheet according to claim 2, wherein the laser light is CO laser light.

4. The method of manufacturing a glass sheet according to claim 2, wherein the initial crack forming step and the laser irradiation step each comprise supporting the first surface of the mother glass sheet with a support member.

5. The method of manufacturing a glass sheet according to claim 2, wherein the laser light is radiated as a circular laser spot.

6. The method of manufacturing a glass sheet according to claim 5, wherein the laser irradiation step comprises cooling a periphery of an irradiation position of the laser light.

7. The method of manufacturing a glass sheet according to claim 2, wherein the laser irradiation step comprises supporting the mother glass sheet with a surface plate and cooling the surface plate.

8. The method of manufacturing a glass sheet according to claim 7, wherein the cooling of the laser irradiation step comprises cooling a part of the surface plate in a vicinity of a cleaving end point of the preset cleaving line.

9. The method of manufacturing a glass sheet according to claim 2, wherein the initial crack forming step comprises forming the initial crack in an inner region of the mother glass sheet.

10. The method of manufacturing a glass sheet according to claim 2, wherein the laser irradiation step is performed under a condition in which a thermal stress OT (MPa) of the mother glass sheet calculated by the following mathematical expression 1 satisfies the following mathematical expression 2:

$$\sigma_T = \frac{E \cdot \alpha \cdot \Delta T}{2(1-v)} \qquad \text{[Math. 1]}$$

where E represents a Young's modulus (MPa) of the mother glass sheet, $\alpha$ represents a thermal expansion coefficient (/K) of the mother glass sheet, v represents a Poisson's ratio of the mother glass sheet, and $\Delta T$ represents a difference between a temperature (K) at an irradiation position of the laser light with respect to the mother glass sheet and a temperature (K) at a position away from the irradiation position; and $$40+60t \leq \sigma_T \leq 90+60t \qquad \text{[Math. 2]}$$

where "t" represents a thickness (mm) of the mother glass sheet, and "40+60t" and "90+60t" are thermal stress (MPa) of the mother glass sheet.

* * * * *